United States Patent [19]

Apeldoorn et al.

[11] Patent Number: 5,980,694
[45] Date of Patent: Nov. 9, 1999

[54] APPARATUS FOR THE PURIFICATION OF WATER CONTAMINATED WITH OIL

[75] Inventors: Adrianus P. Apeldoorn, Julianadorp; Jachebus W. Bos, Rijswijk; Johannes J. Dozy, Den Helder; Johannes J. Elling, Breezand; Leonardus C. Gordijn, Rijswijk; Pieter Ottens, Westerland; Wayne S. Penny, Hoorn; Cornelis Spel; Aatje J. Spel-van der Linde, both of Den Helder; Tom M. Vader, Van Ewijckluis; Theodorus J. De Wit, Den Helder, all of Netherlands

[73] Assignee: EMSYS Separation Technology B.V., Den Helder, Netherlands

[21] Appl. No.: 08/836,968

[22] PCT Filed: Nov. 27, 1995

[86] PCT No.: PCT/NL95/00404

§ 371 Date: Jul. 25, 1997

§ 102(e) Date: Jul. 25, 1997

[87] PCT Pub. No.: WO96/16904

PCT Pub. Date: Jun. 6, 1996

[30] Foreign Application Priority Data

Nov. 25, 1994 [NL] Netherlands ............ 9401977

[51] Int. Cl.⁶ .............. B01D 3/10; B01D 3/42; C02F 1/04; C02F 1/72
[52] U.S. Cl. .......... 202/152; 159/43.1; 159/44; 196/100; 196/128; 196/132; 196/114; 202/204; 202/205; 202/236; 203/1; 203/10; 203/11; 203/90; 208/184; 208/187; 210/151; 210/175; 210/294; 210/180; 210/774

[58] Field of Search .................. 203/11, 1, 10, 203/98, 2, 90, 88; 202/204, 205, 152, 158, 236; 196/114, 132, 135–137, 100, 128; 210/774, 758, 151, 175, 294, 180, 181, 183, 513; 208/184, 187; 159/43.1, 44

[56] References Cited

U.S. PATENT DOCUMENTS

| | | | |
|---|---|---|---|
| 4,019,977 | 4/1977 | Hachadoorian et al. | 208/187 |
| 4,088,578 | 5/1978 | Yoshioka et al. | 210/83 |
| 4,089,662 | 5/1978 | Williams | 196/132 |
| 4,137,494 | 1/1979 | Malleg et al. | 324/30 R |
| 4,681,660 | 7/1987 | Budny | 196/46.1 |
| 5,188,742 | 2/1993 | Shurtleff | 210/774 |
| 5,804,081 | 9/1998 | De Gesero et al. | 210/741 |

FOREIGN PATENT DOCUMENTS

| | | |
|---|---|---|
| 2118310 | 7/1972 | France . |
| 2267285 | 11/1975 | France . |
| 4119590 | 1/1992 | Germany . |

Primary Examiner—Virginia Manoharan
Attorney, Agent, or Firm—Jeffrey D. Myers

[57] ABSTRACT

An installation for cleaning oil-polluted water, in particular at oil and gas production plants, is provided with a distillation column having a polluted water feed and at least one contact packing above which the outlet of the polluted water feed is located, a vapor discharge, a clean water outlet and a measuring device for the analysis of the water from the clean water outlet.

68 Claims, 3 Drawing Sheets

APPARATUS FOR THE PURIFICATION OF WATER CONTAMINATED WITH OIL

This application is the national phase of international application Ser. No. PCT/NL95/00404, which has an international filing date of Nov. 27, 1995 and claiming priority to Dutch application Ser. No. NL 9401977 filed on Nov. 25, 1994.

The invention relates to an installation for cleaning oil-polluted water, in particular near oil and gas production plants.

FR-A-2.267.285 concerning a process for the treatment of polluted water, is a multistage process operating in a first step at underpressure and in a final step under vacuum to obtain a concentrated residue for use in landfill. The process according to this citation employs various flows, i.e. a flow with hydrocarbons having a boiling temperature less than 95° C., a flow having hydrocarbons with boiling temperature between 95 and 110° C., and a flow having hydrocarbons with a boiling temperature in excess of 110° C.

U.S. Pat. No. 4,019,977 concerns an oil reclamation process in which the oil containing liquid contaminants, principally water, is evaporated entirely to separate the oil from the liquid.

Nowadays off shore and on shore production platforms utilize installations such as skimmers, floatation units, hydrocyclones, centrifuges, etc. to separate dispersed oil from production water released during the production of oil and gas. These installations are usually not capable of continuously decreasing the oil concentration in water to about 40 ppm. This 40 ppm limit is the maximum value allowed by many authorities.

It is the object of the invention to provide an installation of the kind mentioned in the preamble whereby not only a high standard of cleaning can be achieved, but whereby this cleaning is achieved in a very energy-efficient way, and whereby also automatic control is possible.

To this end the installation according to the invention is characterized by a distillation column having internal or external heating means as well as means for the generation of a controlled underpressure in the distillation column, and comprising a polluted water feed and at least one contact packing above which the polluted water feed exits, a vapour discharge and a clean water outlet; and a measuring device for the analysis of the water from the clean water outlet.

By means of the distillation column energy-efficient separation of a large percentage of aromatic and aliphatic compounds from the water is attained, thus meeting high cleaning requirements. Nowadays continuous on-line equipment is available for measuring. In this manner the oil content in water can be measured continuously instead of 16 times a month, as is now required by many authorities. By means of certain kinds of analysis devices the content of aliphatic and aromatic compounds in the cleaned water can be measured separately or combined. In addition, the output signals of both devices can be transmitted continuously to a central platform. The performance of the cleaning installation can therefore be monitored and controlled from a distance. Helicopter flights to the various unmanned production platforms for taking samples for laboratory analysis, as occurs with the known off-shore installations, are therefore no longer necessary. Weekly or monthly calibration of the measuring device according to the invention suffices.

The internal heating means applied may, for instance, be electric heating. However, sometimes the application of external heating means may be more desirable; viz. if gas is released on the platform, it may be utilized for heating by means of a separate reboiler.

The installation according to the invention is capable of effectively separating oil from water, whereby the heating means and the pressure decreasing means together realize at least partial evaporation of the polluted water, leading to optimal separation. Further, the underpressure lowers the boiling point of the volatile hydrocarbon components so that for instance, in the distillation column, instead of heating to the boiling point of water, a much lower temperature in the range of 40–60° C. and in some applications even lower, suffices. For some organic components the separation factor is substantially improved if separation is carried out at decreased pressure and temperature. Because many organic compounds have boiling points below that of water, most organic compounds will be concentrated in the vapour phase. However, as many organic compounds together with water form azeotropic compounds, heavy organic compounds with boiling points higher than water will also leave the column in the vapour phase. In this way most of the organic compounds in the polluted water feed will be removed without all the water having to evaporate. The object of the invention is even to evaporate less than 20% of the incoming water. Under certain conditions even only 5% evaporation is possible. Due to the packing there is a large contact surface between the fluid and the vapour phase. This ensures that the water flowing downward, in counterflow to the rising vapour, will be cleaned substantially in a very efficient manner so that the clean water outlet may be connected directly to the bottom of the distillation column. After-cleaning is generally unnecessary; nonetheless, an after-cleaner in the form of a UV-oxidation unit, may be incorporated in the clean water outlet, which will then be placed before the measuring device. Furthermore, according to the invention a pre-cleaning installation may be incorporated in the polluted water feed in order to supply the distillation column with water from which dust particles and part of the oil have been removed so that the distillation column is a little less heavily burdened.

The invention will hereafter be elucidated by means of the drawings illustrating three embodiments of the installation according to the invention.

DESCRIPTION OF THE PREFERRED EMBODIMENTS

In the different embodiments comparable parts are indicated by the same reference number.

Figure 1:
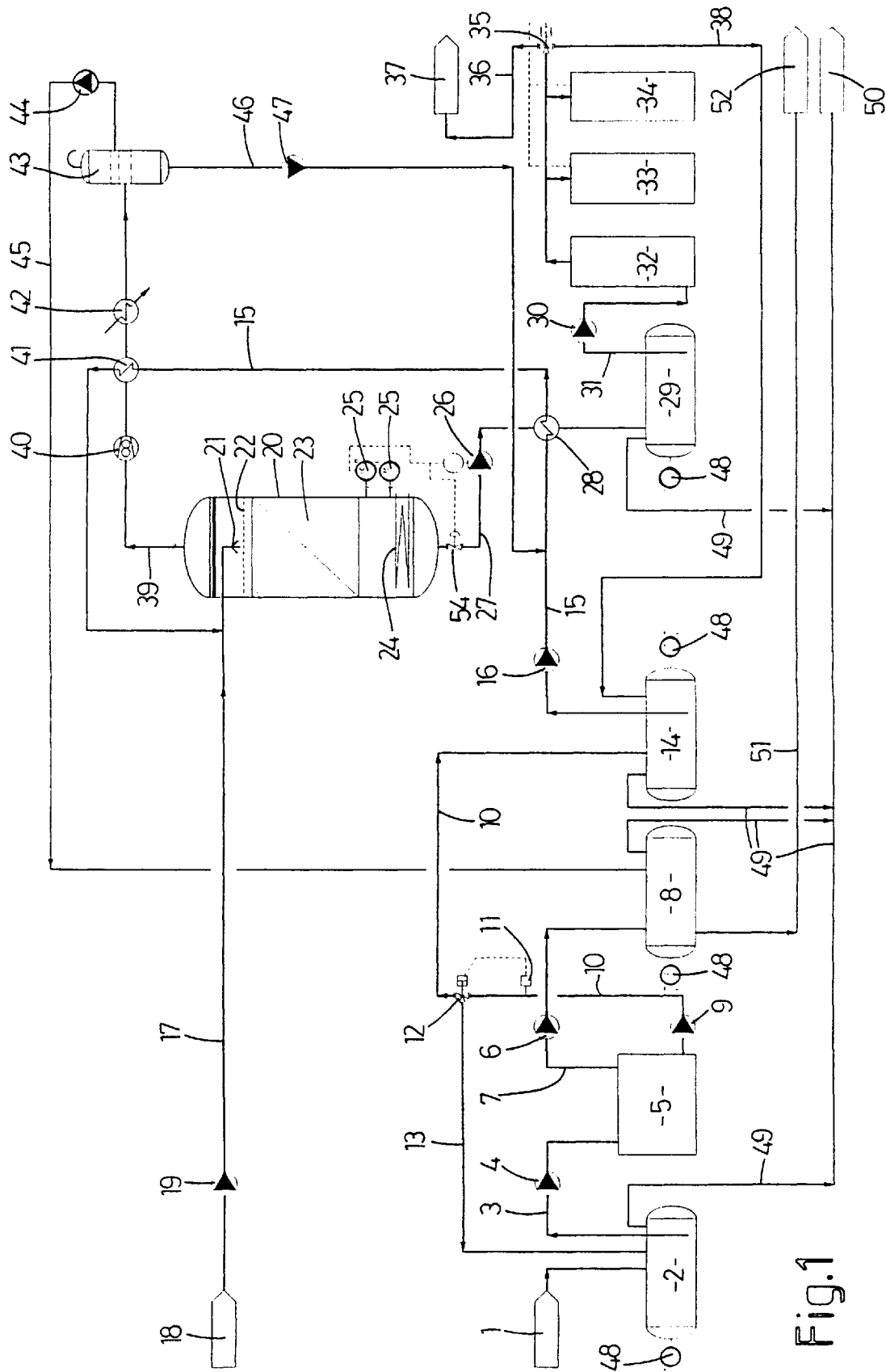
FIGS. 1, 2 and 3 are process diagrams of three embodiments of an installation for cleaning oil-polluted water according to the invention.

FIG. 1 shows a first embodiment of the installation according to the invention. At 1 the polluted water arrives from a collecting tank (not shown) and is collected in a polluted water tank 2. With the aid of a pump 4 provided in the pipe 3 the polluted water is conducted into a pre-separation unit 5 where either mechanically or hydraulically solid particles and possibly oil are separated from the water. This pre-separation unit may take the form of a filter, a hydrocyclone, a centrifuge or a sieve separator or the like. Such a pre-separation unit can already considerably reduce the amount of pollution. With the aid of the pump 6 the separated oil phase is conducted via the pipe 7 to a tank 8 for dirty oil. With the aid of the pump 9 the cleaned water is drained away from the pre-separation unit 5 via the pipe 10, and the oil content in the water of the pipe 10 is measured by means of an analysis installation 11. If the oil content in the water exceeds a predetermined level, then the production water is, via a pipe 13, conducted back to the polluted water tank 2 by means of a threeway valve 12, controlled by the analysis installation 11. If the oil content in the water remains below the predetermined limit, then the water is pumped further via the threeway valve 12 through the pipe 10 to an intermediate storage tank 14.

A pipe 15 provided with a pump 16 for pumping on the pre-treated production water is connected to the intermediate storage tank 14. The pipe 15 finally connects to a pipe 17, at the feed side 18 from which sea water can be supplied which by means of a pump 19 can be pumped to the outlet side of the pipe 17. The outlet side of this pipe 17, through which optionally fresh sea water (in the case of an off shore installation) for the purpose of starting up the whole installation or pre-treated production water from the pipe 15 can be drained away, ends in the distillation column 20, which is the heart of the installation. The outlet side of the pipe 17 is provided with a sprinkler head 21 distributing the water supplied to the distillation column 20, which water is preferably sprinkled onto a fluid distributor 22, such as a grid or a perforated plate, in order to promote a uniform distribution of moisture. Under the fluid distributor 22 a packing 23 of known construction is provided, which packing serves to provide a very large contact area in a small space. The fluid distributor ensures that the packing 23 is moistened even better.

The prevailing pressure in the distillation column 20 is preferably an underpressure in order to achieve evaporation of the components contained in the supplied production water without necessitating a considerable rise in temperature by means, in this case, of an electric heating installation 24 near the bottom of the distillation column 20. Most organic compounds will be concentrated in the vapour phase because the boiling point of many organic compounds is lower than that of water. However, many organic compounds together with water form azeotropic compounds, so that heavy organic compounds having boiling points higher than water, will also leave the distillation column 20 in the vapour phase. In this way most organic compounds present in the supplied production water will be removed without evaporating too much water. The aim is that of the water itself less than 20%, and preferably only 5% is evaporated. This lowers the energy consumption considerably. The water that is not evaporated and from which most of the organic compounds are removed, will collect on the bottom of the distillation column 20. The electric heating installation is located below the surface of this collected water and the level controls 25 ensure that the water level on the bottom of the distillation column 20 stays within certain limits by controlling a pump 26 in an outlet pipe 27 or a valve 54 therein.

The outlet pipe 27 further comprises a heat exchanger 28 through which, in a separate pipe system, the pre-cleaned water of pipe 15 flows, in order to pre-heat the pre-cleaned water 15 with the aid of the water which was warmed up in the distillation column 20. From the outlet pipe 27 the cleaned water flows into the tank 29. A pipe 31 provided with a pump 30 is connected to the tank 29, for pumping the cleaned water to an optional, and usually superfluous, after-cleaning installation, comprised in this case of a UV-oxidation unit 32. This UV-oxidation unit eliminates any remaining aromatic compounds in the water. Before the water coming from this oxidation unit 32 is discharged again, the content of aliphatic and aromatic compounds is measured in the analysis installation 33 for aliphatics and in the analysis installation 34 for aromatics. These analysis installations 33 and 34 constantly monitor the aliphatics and aromatics contents enabling them, with the aid of the threeway valve controlled by them, to determine whether the sufficiently cleaned water is discharged at 37 via the pipe 36 into, for instance the sea or whether, if insufficiently cleaned, it is returned via a pipe 38 to an intermediary tank 14 for pre-cleaned water in order to be retreated in the distillation column 20. The entire installation can be monitored and controlled from a distance because the output signals from the analysis installations 33 and 34 can be sent to a central control platform.

Returning to the distillation column 20 the drawing further shows that the vapour rising upward, thus in counterflow with the water flowing down, and therefore establishing a good contact, can be discharged in the top of the distillation column 20 with the aid of a vapour discharge pipe 39 comprising a vacuum pump 40 to generate the underpressure in the distillation column 20 and for drawing off the vapour through the vapour discharge pipe 39. The vapour discharged from the vacuum pump 40 is in most cases very hot and can be utilized in the heat exchanger 41 to further pre-heat the pre-cleaned production water flowing through pipe 15 and the heat exchanger 41. The somewhat cooled vapour is subsequently condensed by means of cooling in a cooling installation 42, whereby the condensate divides into two phases, viz. an organic phase and a water phase. The two phases are then separated in a two-phase separator 43 such as a settler or a hydrocyclone, a centrifuge, a decantation installation or the like. With the aid of a pump 44 the organic phase is then drained away via a pipe 45 to a tank 8 for dirty oil. The pump 47 pumps the water phase through the pipe 46 to the pipe 15 in order to be returned to the distillation column 20.

Of course, as is usual with such installations, all kinds of safety provisions (not shown here) are provided. However, FIG. 1 does show that all tanks (2,8,14 and 29) are provided with level controls 48 which, when the level in a particular tank is too high, will open a corresponding overflow pipe 49 in order to let the surplus fluid flow away at 50 to the collector tank for the production water. The fluid collected in the tank 8 as dirty oil, is during normal operation emptied via pipe 51 and at 52 the dirty oil is either led to a special tank in which the oil is collected for further treatment or drainage, or is returned to the production process.

Figure 2:
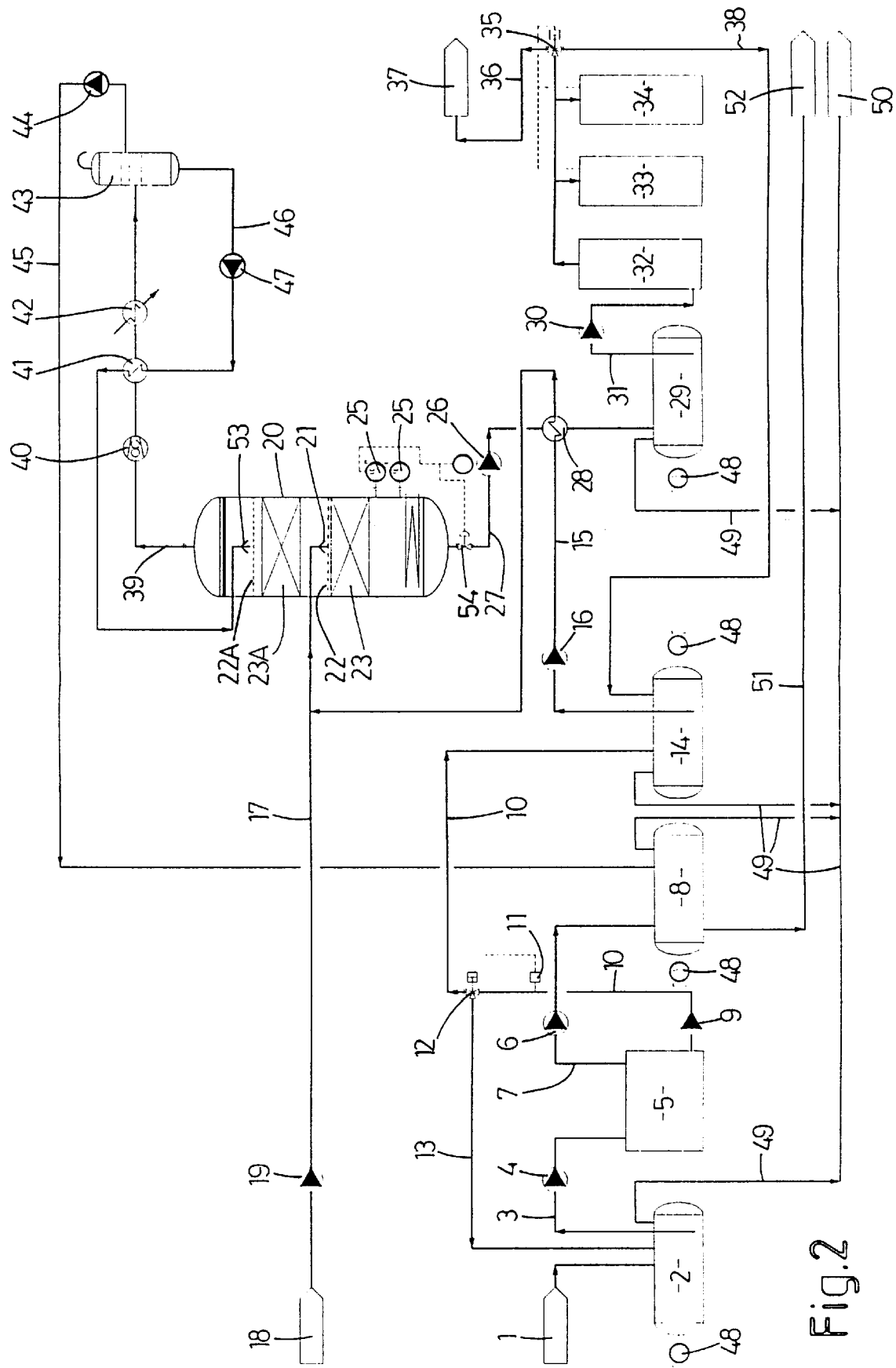

FIG. 2 shows a slightly adapted variant of the installation according to FIG. 1. In this variant the installation column 20 is provided with two packings 23 and 23A, wherein the sprinkler element 21 for the pre-cleaned production water and the fresh seawater discharges above the lower packing 23, while a sprinkler element 53, attached to the end of pipe 46, discharges above the upper packing 23A, returning the water phase from the two-phase separator directly into the distillation column 20, and preferably onto a fluid distributer 22A such as a grid or a perforated plate. In this way the returned water is led through a heat exchanger 41 and is thus reheated.

Figure 3:
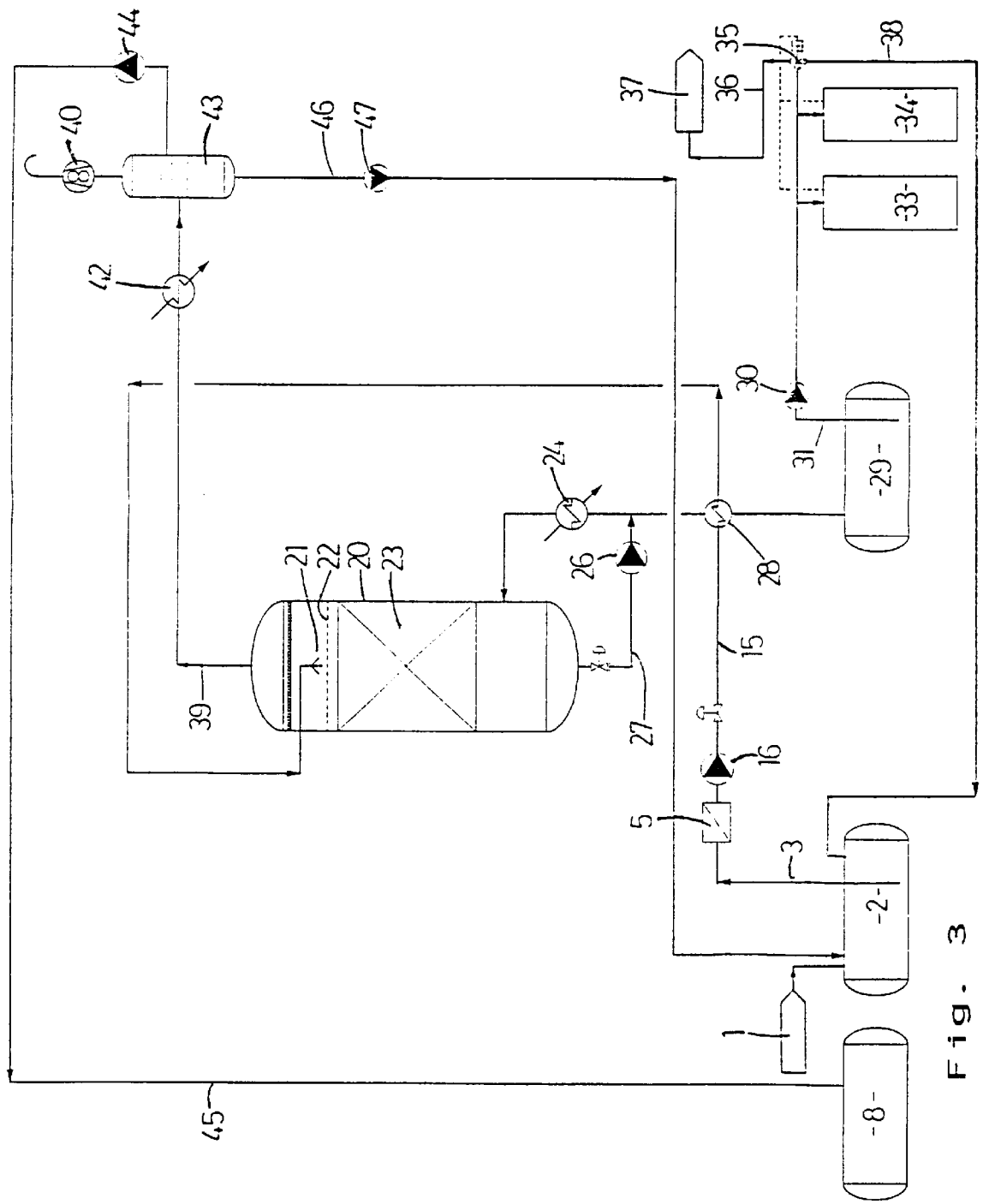

It will be obvious that, depending on the application, the distillation column 20 may be provided with even more packings 23, 23A and fluid distributers 22, 22A. It is also possible in certain applications, where the production water does not contain too many dust particles or oil, to omit the pre-separation installation and to conduct the production water directly into the distillation column 20. Further additions or omissions are also conceivable. This is illustrated in FIG. 3, showing an alternative embodiment of the installation according to the invention, in which the number of installation parts applied is considerably reduced. At reference number 1 polluted water arrives at the installation from a production platform and is received in polluted water tank 2. From this tank 2 the polluted water is conducted via pipe 3 through a filter 5 for the removal of solid particles, whereby the transport energy for the transport of the polluted water is provided by pump 16. In order to be warmed up the polluted water is led through a heat exchanger 28 and further via pipe 15 to a sprinkler element 21 in the distillation column 20. The heat exchanger 28, on the other hand, is fed with heated clean water which is obtained from the distillation column 20 via pipe 27 by means of a pump 26 and is led to the tank 29, from which by means of pump 30, the clean water is then led to the analysis installations 33 and 34 for measuring the content of aliphatic and aromatic compounds. The polluted water which is brought into the distillation column 20 by means of the sprinkler element 21, is sprinkled onto a fluid distributer 22 under which is provided a packing 23 where intensive interaction is obtained between the polluted water and the vapour fraction generated in the distillation column 20. This vapour fraction is obtained with the aid of heating means 24 placed outside of the distillation column 20 and comprises a reboiler fed with electricity or gas, and which serves to heat clean water from the distillation column 20, which water leaves the same at the bottom via pipe 27 and is returned, after passing the heating means 24, into the distillation column 20 under the packing 23. The vapour fraction leaves the distillation column 20 at the top via pipe 39 and is conducted through a condenser 42 where this vapour fraction condenses and splits into two phases, viz. an organic phase and a water phase. The two phases are subsequently separated in a two-phase separator 43, for instance in a settler, to which a vacuum pump 40 is connected to provide both the underpressure in the distillation column 20 and to implement the transport of the vapour fraction. It is preferable to place the vacuum pump 40 after the two-phase separator 43 rather than in the pipe 39 immediately after the distillation column 20, because then the pump 40 may be much smaller, so that a substantial saving in expenditure may be realized. The oil fraction separated in the two-phase separator 43 is transported by means of a pump 44 to a tank 8. The watery fraction which may still contain oil particles, is returned by means of a pump 47 to the polluted water tank 2 via a pipe 46 which is connected to the two-phase separator 43.

The foregoing shows that the invention provides an installation which, by means of relatively simple equipment achieves very good cleaning of the production water, so that the cleaned water can be discharged directly. Of course, the installation according to the invention is not only useful with gas and oil production at sea, but also with a similar production on land. The installation can also be adapted for use with different ordinary installations on land for the separation of oil and water. The invention is not limited to the embodiments shown in the drawings and described in the embodiment examples, which may be varied in different ways without departing from the scope of the invention as specified in the appended claims.

We claim:

1. An installation for cleaning oil-polluted water, said installation comprising:
a distillation column comprising means for generating a controlled underpressure in said column, heating means, a polluted water feed, at least one contact packing above which an outlet of said polluted water feed is located, a vapor discharge, and a clean water outlet; and
a measuring device for analysis of water from the clean water outlet; and wherein said vapor discharge comprises a cooling installation, a two-phase separator, and a water return; and
wherein said means for generating a controlled underpressure is downstream from said two-phase separator.

2. The installation according to claim 1, wherein said heating means comprises a reboiler connected, for feeding and receiving, with said column.

3. The installation according to claim 1, wherein said polluted water feed discharges via a sprinkler element.

4. The installation according to claim 3, wherein said sprinkler element is above a fluid distributor.

5. The installation according to claim 4, wherein said sprinkler element is above a perforated plate.

6. The installation according to claim 3, wherein said water return discharges into said polluted water feed.

7. The installation according to claim 3, wherein said water return discharges into said column via a further sprinkler element.

8. The installation according to claim 7, wherein said further sprinkler element is above said sprinkler element of said polluted water feed.

9. The installation according to claim 8, wherein said further sprinkler element is above said sprinkler element of said polluted water feed and a packing located above it.

10. The installation according to claim 3, wherein said water return discharges into a polluted water tank which, during operation, feeds said polluted water feed.

11. The installation according to claim 1, additionally comprising a heat exchanger between members of a combination selected from the group consisting of said vapor discharge and said polluted water feed, said clean water outlet and said polluted water feed, and said vapor discharge and said water return.

12. The installation according to claim 1, wherein said clean water outlet is connected at a bottom of said column.

13. The installation according to claim 1, wherein said clean water outlet comprises a UV-oxidation unit as after-cleaner located in-stream before said measuring device.

14. The installation according to claim 1, wherein said polluted water feed comprises a pre-separation installation.

15. The installation according to claim 1, wherein said measuring device comprises an analyzer for aliphatic compounds, an analyzer for aromatic compounds, and means for sending signals to a control room situated at a distance from said installation.

16. The installation according to claim 1, wherein said vapor discharge discharges from said column a maximum of 20% of water fed into said column via said polluted water feed.

17. The installation according to claim 16, wherein said vapor discharge discharges from said column a maximum of 5% of water fed into said column via said polluted water feed.

18. An installation for cleaning oil-polluted water, said installation comprising:
a distillation column comprising means for generating a controlled underpressure in said column, heating means, a polluted water feed, at least one contact packing above which an outlet of said polluted water feed is located, a vapor discharge, and a clean water outlet; and
a measuring device for analysis of water from the clean water outlet; and
wherein said clean water outlet comprises a UV-oxidation unit as after-cleaner located in-stream before said measuring device.

19. The installation according to claim 18, wherein said heating means comprises a reboiler connected, for feeding and receiving, with said column.

20. The installation according to claim 18, wherein said polluted water feed discharges via a sprinkler element.

21. The installation according to claim 20, wherein said sprinkler element is above a fluid distributor.

22. The installation according to claim 21, wherein said sprinkler element is above a perforated plate.

23. The installation according to claim 20, wherein said water return discharges into said polluted water feed.

24. The installation according to claim 20, wherein said water return discharges into said column via a further sprinkler element.

25. The installation according to claim 24, wherein said further sprinkler element is above said sprinkler element of said polluted water feed.

26. The installation according to claim 25, wherein said further sprinkler element is above said sprinkler element of said polluted water feed and a packing located above it.

27. The installation according to claim 20, wherein said water return discharges into a polluted water tank which, during operation, feeds said polluted water feed.

28. The installation according to claim 18, wherein said vapor discharge comprises a cooling installation, a two-phase separator, and a water return.

29. The installation according to claim 28, wherein said means for generating a controlled underpressure is downstream from said two-phase separator.

30. The installation according to claim 18, additionally comprising a heat exchanger between members of a combination selected from the group consisting of said vapor discharge and said polluted water feed, said clean water outlet and said polluted water feed, and said vapor discharge and said water return.

31. The installation according to claim 18, wherein said clean water outlet is connected at a bottom of said column.

32. The installation according to claim 18, wherein said polluted water feed comprises a pre-separation installation.

33. The installation according to claim 18, wherein said measuring device comprises an analyzer for aliphatic compounds, an analyzer for aromatic compounds, and means for sending signals to a control room situated at a distance from said installation.

34. The installation according to claim 18, wherein said vapor discharge discharges from said column a maximum of 20% of water fed into said column via said polluted water feed.

35. The installation according to claim 34, wherein said vapor discharge discharges from said column a maximum of 5% of water fed into said column via said polluted water feed.

36. An installation for cleaning oil-polluted water, said installation comprising:
a distillation column comprising means for generating a controlled underpressure in said column, heating means, a polluted water feed, at least one contact packing above which an outlet of said polluted water feed is located, a vapor discharge, and a clean water outlet; and
a measuring device for analysis of water from the clean water outlet; and
wherein said measuring device comprises an analyzer for aliphatic compounds, an analyzer for aromatic compounds, and means for sending signals to a control room situated at a distance from said installation.

37. The installation according to claim 36, wherein said heating means comprises a reboiler connected, for feeding and receiving, with said column.

38. The installation according to claim 36, wherein said polluted water feed discharges via a sprinkler element.

39. The installation according to claim 38, wherein said sprinkler element is above a fluid distributor.

40. The installation according to claim 39, wherein said sprinkler element is above a perforated plate.

41. The installation according to claim 38, wherein said water return discharges into said polluted water feed.

42. The installation according to claim 38, wherein said water return discharges into said column via a further sprinkler element.

43. The installation according to claim 42, wherein said further sprinkler element is above said sprinkler element of said polluted water feed.

44. The installation according to claim 43, wherein said further sprinkler element is above said sprinkler element of said polluted water feed and a packing located above it.

45. The installation according to claim 38, wherein said water return discharges into a polluted water tank which, during operation, feeds said polluted water feed.

46. The installation according to claim 36, wherein said vapor discharge comprises a cooling installation, a two-phase separator, and a water return.

47. The installation according to claim 46, wherein said means for generating a controlled underpressure is downstream from said two-phase separator.

48. The installation according to claim 36, additionally comprising a heat exchanger between members of a combination selected from the group consisting of said vapor discharge and said polluted water feed, said clean water outlet and said polluted water feed, and said vapor discharge and said water return.

49. The installation according to claim 36, wherein said clean water outlet is connected at a bottom of said column.

50. The installation according to claim 36, wherein said clean water outlet comprises a UV-oxidation unit as after-cleaner located in-stream before said measuring device.

51. The installation according to claim 36, wherein said polluted water feed comprises a pre-separation installation.

52. The installation according to claim 36, wherein said vapor discharge discharges from said column a maximum of 20% of water fed into said column via said polluted water feed.

53. The installation according to claim 52, wherein said vapor discharge discharges from said column a maximum of 5% of water fed into said column via said polluted water feed.

54. An installation for cleaning oil-polluted water, said installation comprising:
a distillation column comprising means for generating a controlled underpressure in said column, heating means, a polluted water feed, at least one contact packing above which an outlet of said polluted water feed is located, a vapor discharge, and a clean water outlet; and
a measuring device for analysis of water from the clean water outlet; and
wherein said sprinkler element is above a fluid distributor; and
wherein said water return discharges into said column via a further sprinkler element located above said sprinkler element of said polluted water feed and a packing located above it.

55. The installation according to claim 54, wherein said heating means comprises a reboiler connected, for feeding and receiving, with said column.

56. The installation according to claim 54, wherein said polluted water feed discharges via a sprinkler element.

57. The installation according to claim 56, wherein said sprinkler element is above a perforated plate.

58. The installation according to claim 54, wherein said water return discharges into said polluted water feed.

59. The installation according to claim 54, wherein said water return discharges into a polluted water tank which, during operation, feeds said polluted water feed.

60. The installation according to claim 54, wherein said vapor discharge comprises a cooling installation, a two-phase separator, and a water return.

61. The installation according to claim 60, wherein said means for generating a controlled underpressure is downstream from said two-phase separator.

62. The installation according to claim 54, additionally comprising a heat exchanger between members of a combination selected from the group consisting of said vapor discharge and said polluted water feed, said clean water outlet and said polluted water feed, and said vapor discharge and said water return.

63. The installation according to claim 54, wherein said clean water outlet is connected at a bottom of said column.

64. The installation according to claim 54, wherein said clean water outlet comprises a UV-oxidation unit as after-cleaner located in-stream before said measuring device.

65. The installation according to claim 54, wherein said polluted water feed comprises a pre-separation installation.

66. The installation according to claim 54, wherein said measuring device comprises an analyzer for aliphatic compounds, an analyzer for aromatic compounds, and means for sending signals to a control room situated at a distance from said installation.

67. The installation according to claim 54, wherein said vapor discharge discharges from said column a maximum of 20% of water fed into said column via said polluted water feed.

68. The installation according to claim 67, wherein said vapor discharge discharges from said column a maximum of 5% of water fed into said column via said polluted water feed.

* * * * *